United States Patent
Matarrese et al.

(10) Patent No.: US 10,669,897 B2
(45) Date of Patent: Jun. 2, 2020

(54) COMPONENTS AND SYSTEMS FOR REDUCING THERMAL STRESS OF HEAT RECOVERY STEAM GENERATORS IN COMBINED CYCLE POWER PLANT SYSTEMS

(71) Applicant: General Electric Company, Schenectady, NY (US)

(72) Inventors: Alessandro Matarrese, Simsbury, CT (US); Donald William Bairley, Farmington, CT (US); Wesley Paul Bauver, II, Granville, MA (US); Van Dang, Bloomfield, CT (US)

(73) Assignee: General Electric Company, Schenectady, NY (US)

( * ) Notice: Subject to any disclaimer, the term of this patent is extended or adjusted under 35 U.S.C. 154(b) by 357 days.

(21) Appl. No.: 15/833,311

(22) Filed: Dec. 6, 2017

(65) Prior Publication Data
US 2019/0170022 A1 Jun. 6, 2019

(51) Int. Cl.
*F22B 37/00* (2006.01)
*F22B 37/22* (2006.01)
(Continued)

(52) U.S. Cl.
CPC ............... *F01K 13/02* (2013.01); *F01K 3/18* (2013.01); *F01K 23/10* (2013.01); *F01L 19/02* (2013.01); *F22B 1/1815* (2013.01); *F02C 6/18* (2013.01)

(58) Field of Classification Search
CPC ........ F22B 1/1815; F22B 1/028; F22B 37/00; F22B 37/22; F22B 37/228; F22B 37/226
See application file for complete search history.

(56) References Cited

U.S. PATENT DOCUMENTS 2,982,713 A * 5/1961 North, Jr. ............... G21C 3/32
376/397
4,285,203 A 8/1981 Vakil
(Continued)

FOREIGN PATENT DOCUMENTS

CN 202868825 U 4/2013
DE 102012204081 A1 9/2013
(Continued)

*Primary Examiner* — Gregory A Wilson
(74) *Attorney, Agent, or Firm* — Charlotte Wilson; Hoffman Warnick LLC

(57) ABSTRACT

Heat recovery steam generators (HRSGs) including components and systems for reducing thermal stress experienced by manifolds within the HRSGs are disclosed. The HRSG may include a manifold receiving a working fluid of the HRSG, a plurality of piping links in fluid communication with the manifold, and an enclosure surrounding the manifold and the plurality of piping links. The HRSG may also include at least one thermal element positioned within the enclosure. The thermal element(s) may surround the manifold. Additionally, or alternatively, the HRSG may include a supplemental heating system in fluid communication with an interior of the enclosure. The supplemental heating system may include a heater for heating fluid (e.g., air), and an inlet conduit in fluid communication with and positioned downstream of the heater. The inlet conduit may be formed through the enclosure to provide the heated fluid to the interior of the enclosure.

20 Claims, 12 Drawing Sheets

(51) Int. Cl.
   *F01K 13/02* (2006.01)
   *F01K 23/10* (2006.01)
   *F22B 1/18* (2006.01)
   *F01L 19/02* (2006.01)
   *F01K 3/18* (2006.01)
   *F02C 6/18* (2006.01)

(56) References Cited

U.S. PATENT DOCUMENTS

| | | | |
|---|---|---|---|
| 4,347,706 A | | 9/1982 | Drost |
| 4,479,353 A | | 10/1984 | Schluderberg |
| 7,357,100 B2 | * | 4/2008 | Waseda ................ F22B 1/1815 |
| | | | 122/510 |
| 9,194,377 B2 | | 11/2015 | Terdalkar et al. |
| 9,739,475 B2 | * | 8/2017 | Magee ................ F22B 1/1815 |
| 2009/0121495 A1 | | 5/2009 | Mills |
| 2013/0127164 A1 | | 5/2013 | Pena et al. |
| 2014/0137555 A1 | | 5/2014 | Del Campo et al. |
| 2017/0307208 A1 | * | 10/2017 | Hennessey ................ F28F 9/22 |

FOREIGN PATENT DOCUMENTS

| | | |
|---|---|---|
| EP | 2589760 A1 | 8/2013 |
| WO | 2012150969 A1 | 11/2012 |
| WO | 2013005192 A1 | 1/2013 |

* cited by examiner

COMPONENTS AND SYSTEMS FOR REDUCING THERMAL STRESS OF HEAT RECOVERY STEAM GENERATORS IN COMBINED CYCLE POWER PLANT SYSTEMS

BACKGROUND OF THE INVENTION

The disclosure relates generally to combined cycle power plant system, and more particularly, to components and systems for reducing thermal stress experienced by manifolds within a heat recovery steam generator (HRSG) of the combined cycle power plant system.

Power systems typically include a variety of different turbomachines and/or systems that are used to generate operational load and/or power output. Two conventional power systems used to generate operational loads include gas turbine systems and combined cycle power plants, which typically include a gas turbine system(s). Conventional combined cycle power plants employ one or multiple gas turbine system(s) operatively coupled to one or multiple steam turbine system(s). The gas turbine system includes a compressor coupled to a gas turbine. The gas turbine is usually coupled to and drives an external component, such as a generator, for producing a load or power output. The steam turbine system includes a high pressure (HP) turbine portion operatively coupled to an intermediate pressure (IP) turbine portion that, in turn, is coupled to a low pressure (LP) turbine. Similar to the gas turbine of the gas turbine system, the HP, IP and LP turbines are employed to drive an external component (e.g., generator). In a typical combined cycle power plant, exhaust gas from the gas turbine is passed to a heat recovery steam generator (HRSG), which may be used to reheat and provide steam to the various turbines of the steam turbine system for enhanced efficiency of the system and/or power plant. Downstream of the HRSG the exhaust gas is released to the atmosphere through a stack.

However, during operation of the power system, portions and/or components may experience high stress due to rapid temperature change of the components, which results in undesirable thermal fatigue of the components. For example, when the power system is first started during a start-up procedure, the HRSG may immediately begin to generate high temperature steam. This high temperature steam may be provided, supplied and/or move through portions of a boiler module of the HRSG which may be at reduced or pre-start temperature (e.g., ambient temperature) that is significantly lower than the temperature of the high temperature steam. As a result of the exposure to the high temperature steam the portions of the boiler module of the HRSG may undergo a rapid temperature change. The rapid temperature change may increase the stress experienced by the boiler module and/or its various components exposed to the high temperature steam during the start-up procedure. Once the power system is operational for a predetermined amount of time, the components of the boiler module may be consistently heated to an operational temperature, which in turn may reduce the stress experienced by the components. The reduction of the stress through the repetition of the event across the operational life may reduce the thermal fatigue experienced by the components.

However, when the power plant is shut down again (e.g., not operational), the temperature of the components forming the boiler module may again decrease to the pre-start temperature, and upon the next start-up procedure, may experience the same high stress. Because of continued exposure to high stress, components of the boiler module may degrade and/or become damaged due to thermal fatigue, which may result in reduced operational performance/reliability and/or failure of the power system. Additionally, because the components become damaged, they eventually need to be replaced, which requires the power system to be completely shutdown or inoperable while the damaged components are replaced. The necessity to replace the damaged parts within the power system may reduce the operational time of the power system, which reduces the overall power or load output, and also increases the maintenance costs (e.g., component replacement) for the power system over the operational life of the system.

BRIEF DESCRIPTION OF THE INVENTION

A first aspect of the disclosure provides a heat recover steam generator (HRSG). The HRSG includes: a manifold receiving a working fluid of the HRSG; a plurality of piping links in fluid communication with the manifold; an enclosure surrounding the manifold and at least a portion of the plurality of piping links; and at least one thermal element positioned within the enclosure, the at least one thermal element surrounding the manifold.

A second aspect of the disclosure provides a heat recover steam generator (HRSG). The HRSG includes: a manifold receiving a working fluid of the HRSG; a plurality of piping links in fluid communication with the manifold; an enclosure including an interior, the enclosure surrounding the manifold and at least a portion of the plurality of piping links; and a supplemental heating system in fluid communication with the interior of the enclosure, the supplemental heating system including: a heater for heating fluid; and an inlet conduit in fluid communication with and positioned downstream of the heater, the inlet conduit formed through the enclosure to provide the heated fluid to the interior of the enclosure.

A third aspect of the disclosure provides a combined cycle power plant system including: a gas turbine system including a turbine component discharging an exhaust gas; and a heat recover steam generator (HRSG) in fluid communication with the turbine component for receiving the exhaust gas, the HRSG including: a manifold receiving a working fluid of the HRSG; a plurality of piping links in fluid communication with the manifold; an enclosure including an interior, the enclosure surrounding the manifold and at least a portion of the plurality of piping links; and at least one of: at least one thermal element positioned within the enclosure, the at least one thermal element surrounding the manifold, or a supplemental heating system in fluid communication with the interior of the enclosure, the supplemental heating system including: a heater for heating fluid; and an inlet conduit in fluid communication with and positioned downstream of the heater, the inlet conduit formed through the enclosure to provide the heated fluid to the interior of the enclosure.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
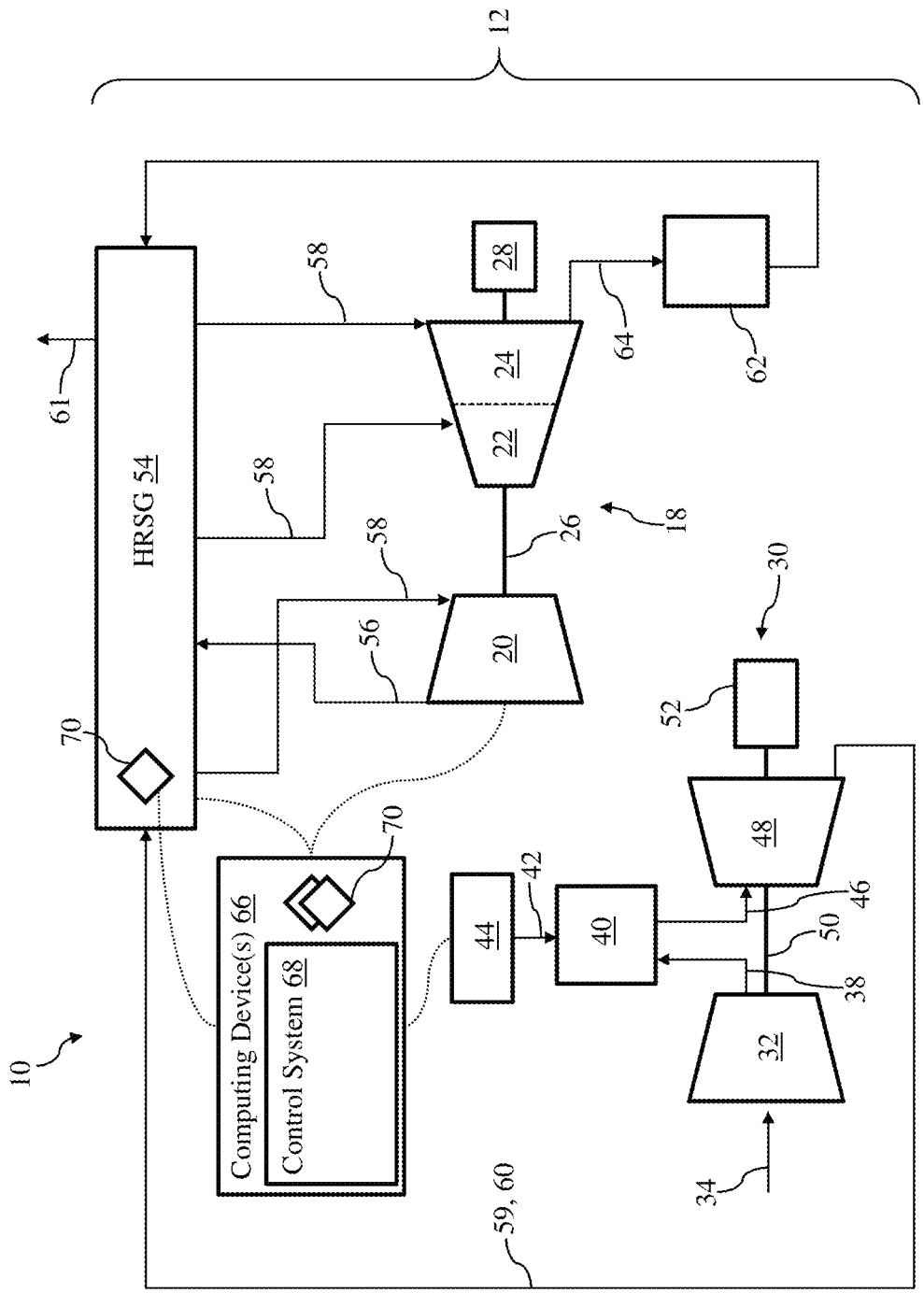
FIG. 1 shows a schematic depiction of a combined cycle power plant system including a gas turbine system, a steam turbine system and a control system, according to embodiments.

As an initial matter, in order to clearly describe the current disclosure it will become necessary to select certain terminology when referring to and describing relevant machine components within a combined cycle power plant system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air/fluid through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

As indicated above, the disclosure relates generally to combined cycle power plant system, and more particularly, to components and systems for reducing thermal stress experienced by manifolds within a heat recovery steam generator (HRSG) of the combined cycle power plant system.

These and other embodiments are discussed below with reference to FIGS. 1-12. However, those skilled in the art will readily appreciate that the detailed description given herein with respect to these Figures is for explanatory purposes only and should not be construed as limiting.

FIG. 1 shows a schematic depiction of a system 10 according to various embodiments of the disclosure. As shown, system 10 can include a combined cycle power plant system 12 (hereafter, "power plant system 12") including a steam turbine (ST) system 18, which in the depiction shown, can include a high pressure (HP) portion 20, an intermediate pressure (IP) portion 22 and a low pressure (LP) portion 24, as is known in the art. HP portion 20, IP portion 22 and LP portion 24 of ST system 18 may all be coupled and/or positioned on and/or may be configured to rotate a shaft 26 to produce mechanical work and/or to drive an additional component of ST system 18. As shown in FIG. 1, shaft 26 of ST system 18 may be coupled to and/or may drive an external component, and more specifically, a generator 28 configured to generate power and/or produce a load.

Power plant system 12 can further include a gas turbine (GT) system 30. GT system 30 may include a compressor 32. Compressor 32 compresses an incoming flow of fluid 34 (e.g., air) as it flows through compressor 32. GT system 30 may also include a plurality of stages of stator vanes (not shown) and rotating blades (not shown) positioned within compressor 32. The stator vanes and rotating blades positioned within compressor 32 may be configured to aid in moving and/or passing fluid 34 through compressor 32. Compressor 32 delivers a flow of compressed fluid 38 (e.g., compressed air) to a combustor 40. Combustor 40 mixes the flow of compressed fluid 38 with a pressurized flow of fuel 42 provided by a fuel supply 44 and ignites the mixture to create a flow of combustion gas 46. The flow of combustion gas 46 is in turn delivered to a turbine component 48, which typically includes a plurality of stages of stator vanes (not shown) and turbine blades (not shown), similar to compressor 32. The flow of combustion gas 46 drives turbine component 48 to produce mechanical work. The mechanical work produced in turbine component 48 drives compressor 32 via a shaft 50, and may be used to drive a generator 52 (e.g., external component) configured to generate power and/or produce a load.

Although power plant system 12 is shown in FIG. 1 to include a dual-shaft configuration where two separate generators 28, 52 are utilized, it is understood that in other non-limiting examples, ST system 18 and GT system 30 may share a single shaft and in turn, may share a single generator. Additionally, although power plant system 12 is shown to only include a single ST system 18 and single GT system 30, it is understood that power plant system 12 may include a plurality of ST systems 18 and/or GT system(s) 30 that may be configured to generate an operational load and/or power output.

Power plant system 12 can further include a heat recovery steam generator (HRSG) 54 fluidly connected with the ST system 18 (e.g., with HP portion 20, IP portion 22 and/or LP portion 24) and GT system 30. As shown in the non-limiting example of FIG. 1, HRSG 54 may be fluidly connected and/or coupled with ST system 18 via exhaust conduit(s) 56 to receive exhaust fluid (e.g., steam) from ST system 18, as well as, provide steam to the portions of ST system 18 via supply conduits 58. Additionally in the non-limiting example of FIG. 1, HRSG 54 may be fluidly connected and/or coupled with GT system 30 via an exhaust channel 59 coupled to and/or in fluid communication with turbine component 48. Exhaust channel 59 may provide exhaust fluid 60 (e.g., gas) from GT system 30 to HRSG 54 to be utilized in generating and/or heating steam for ST system 18. A stack 61 of HRSG 54 may exhaust or release (excess or used) gas (e.g., exhaust fluid 60) and/or fluid from HRSG 54 into the atmosphere and/or out of power plant system 12.

Power plant system 12 can further include a condenser 62. Condenser 62 may be in fluid communication and/or may be fluidly coupled with various components of power plant system 12. In a non-limiting example, condenser 62 may be fluidly connected and/or coupled to LP portion 24 of ST system 18 via steam exhaust duct 64. Condenser 62 may be configured to condense exhaust flow and/or bypass flow (not shown) from ST system 18 and/or HRSG 54, and providing condensed fluid (e.g., condensate water) to HRSG 54, as is known in the art.

As shown in FIG. 1, system 10 can include at least one computing device 66 configured to control power plant system 12. Computing device(s) 66 can be hard-wired and/or wirelessly connected to and/or in communication with power plant system 12, and its various components (e.g., ST system 18, GT system 30, HRSG 54 and so on) via any suitable electronic and/or mechanical communication component or technique. Computing device(s) 66, and its various components discussed herein, may be a single stand-alone system that functions separate from another power plant control system (e.g., computing device)(not shown) that may control and/or adjust operations and/or functions of power plant system 12, and its various components (e.g., ST system 18, GT system 30 and so on). Alternatively, computing device(s) 66 and its components may be integrally formed within, in communication with and/or formed as a part of a larger power plant control system (e.g., computing device) (not shown) that may control and/or adjust operations and/or functions of power plant system 12, and its various components (e.g., ST system 18, GT system 30 and so on).

In various embodiments, computing device(s) 66 can include a control system 68 and a plurality of sensor(s) 70, as described herein, for controlling operations of power plant system 12. As discussed herein control system 68 can control power plant system 12, and its various components, to optimize performance of power plant system 12, and/or increase the operational life of the components of power plant system 12. For example, and as discussed herein, control system 68 may utilize data and/or operational characteristics of HRSG 54, and the components included therein, determined by sensor(s) 70 to control the operation of components included within the HRSG 54 to ultimately improve or optimize performance of HRSG 54, and/or increase the operational life of components of HRSG 54.

As shown in FIG. 1, computing device(s) 66 may include and/or may be in electrical and/or mechanical communication with a plurality of sensors 70 positioned throughout system 10. As shown in the non-limiting example of FIG. 1, and discussed herein, at least one sensor 70 of and/or connected to computing device(s) 66 may be positioned within HRSG 54 (See also, FIGS. 6, 8, and 9). Sensor(s) 70 in communication with computing device(s) 66 of system 10 may be any suitable sensor or device configured to detect and/or determine data, information, and/or characteristics relating to power plant system 12 during operation. For example, and as discussed herein, sensor(s) 70 positioned within HRSG 54 of power plant system 12 may be any suitable sensor configured to detect and/or determine a fluid temperature within an enclosure or manifold(s) of the HRSG 54 and/or a surface temperature of a component of HRSG 54 of power plant system 12. In non-limiting examples, sensor(s) 70 may be configured as, but not limited to, thermometers, thermistor, thermocouples, and/or any other mechanical/electrical temperature sensor.

Although two sensor 70 are shown, it is understood that system 10 may include more sensor(s) 70 (see, FIGS. 6, 8, and 9) that may be configured to provide computing device(s) 66, and specifically control system 68, with information or data relating to the temperature of the fluids within HRSG 54. The number of sensors 70 shown in FIG. 1 is merely illustrative and non-limiting. As such, system 10 may include more or less sensors 70 than what is depicted in the Figures.

Figure 2:
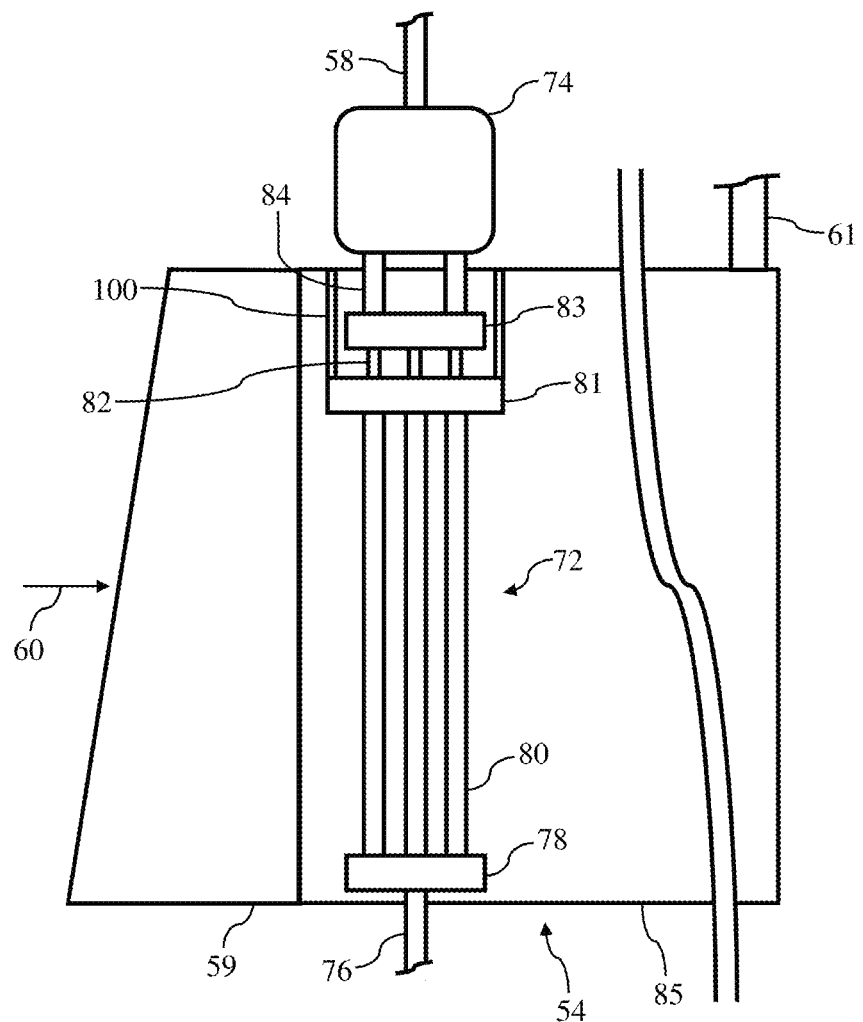
FIG. 2 shows a schematic depiction of a portion of a heat recovery steam generator (HRSG) of the combined cycle power plant system of FIG. 1, according to embodiments.

FIG. 2 shows a schematic view of a portion of HRSG 54 of power plant system 12 shown in FIG. 1. Specifically, FIG. 2 shows a schematic view of a portion of HRSG 54 and a portion of the component and/or systems included therein for generating and providing steam to the portions of ST system 18 (see, FIG. 1) via supply conduits 58, as discussed herein. It is understood that similarly numbered and/or named components may function in a substantially similar fashion. Redundant explanation of these components has been omitted for clarity.

As shown in FIG. 2, and as discussed herein with respect to FIG. 1, exhaust channel 59 may provide exhaust fluid 60 (e.g., gas) from GT system 30 (see, FIG. 1) to HRSG 54. Exhaust fluid 60 may flow through HRSG 54, and/or over a plurality of components of HRSG 54, discussed herein, to generate and/or heat steam that may be provided to ST system 18 via supply conduits 58. Once exhaust fluid 60 pass through HRSG 54, exhaust fluid 60 may exhaust or release from HRSG 54 into the atmosphere and/or out of power plant system 12 via stack 61 of HRSG 54.

HRSG 54 may include a plurality of components and/or systems that may utilize the heat of exhaust fluid 60 to generate and/or heat steam for ST system 18. As shown in FIG. 2, HRSG 54 may include at least one boiler module 72 extending through and/or positioned within each HRSG 54. Boiler module 72 shown in FIG. 2 may correspond to a steam generator of HRSG 54 for generating steam for ST system 18, as discussed herein. In other non-limiting examples, boiler module 72 may form the evaporator, economizers, superheaters, and/or reheaters of HRSG 54. Although only a single boiler module 72 is shown, it is understood that HRSG 54 may also include at least one additional boiler module generating, receiving, and/or supplying steam for ST system 18.

Boiler module 72 of HRSG 54 may correspond to and/or may be in fluid communication with a respective steam drum 74 of HRSG 54 for receiving, generating and/or providing steam. As shown in the non-limiting example of FIG. 2 where boiler module 72 is formed as a steam generator for HRSG 54, boiler module 72 may correspond to and/or may be in fluid communication with a high pressure (HP) steam drum 74. Supply conduit 58 may be in fluid communication with HP steam drum 74 and may provide steam generated and/or supplied to HP steam drum 74 to HP portion 20 of ST system 18. Although only HP steam drum 74, and corresponding boiler module 72 are shown in FIG. 2, it is understood that HRSG 54 may also include at least one additional boiler module and corresponding intermediate pressure (IP) steam pressure drum for generating, receiving, and/or supplying steam to IP portion 22 of ST system 18, and low pressure (LP) steam pressure drum for generating, receiving, and/or supplying steam to LP portion 24 of ST system 18, respectively.

As shown in FIG. 2, boiler module 72 may include at least one feed water conduit 76 in fluid communication with a first manifold 78, and a plurality of boiler tubes 80 coupled to and/or in fluid communication with first manifold 78. The plurality of boiler tubes 80 of boiler module 72 may also be coupled to and/or in fluid communication with a header 81 of boiler module 72. That is, and similar to first manifold 78, header 81 of boiler module 72 may be coupled to and/or in fluid communication with each of the plurality of boiler tubes 80. As shown in FIG. 2, a plurality of piping links 82 may fluidly couple and/or be positioned between header 81 and a second manifold 83 of boiler module 72. Boiler module 72 may also include at least one steam conduit 84 positioned between and fluidly coupling second manifold 83 to HP steam drum 74 (or directly to the supply conduits 58, where boiler module 72 may form economizers, superheaters, and/or reheaters of HRSG 54). In the non-limiting example shown in FIG. 2, first manifold 78, the plurality of boiler tubes 80, header 81, the plurality of piping links 82, and second manifold 83 of boiler module 72 may all be positioned within a housing 85 of HRSG 54. Additionally, feed water conduit 76 and steam conduit(s) 84 may be positioned at least partially within and/or may extend through housing 85 of HRSG 54.

During operation of power plant system 12 (see, FIG. 1), exhaust fluid 60 generated by GT system 30 may flow through HRSG 54 and/or may pass over boiler module 72, and more specifically at least the plurality of boiler tubes 80. In other non-limiting examples, first manifold 78, header 81, the plurality of piping links 82, and/or second manifold 83 of boiler module 72 may also be exposed to a portion of exhaust fluid 60 flowing through HRSG 54. In the non-limiting example where boiler module 72 is a steam generator for HRSG 54, exhaust fluid 60 may flow through HRSG 54, and feed water conduit 76 may supply feed water to first manifold 78, which in turn may supply the feed water to the plurality of boiler tubes 80. When exposed to high-temperature exhaust fluid 60, the feed water supplied to the plurality of boiler tubes 80 may be converted to steam, and/or may result in the generation of steam being formed in the plurality of boiler tubes 80. The generated steam may move from the plurality of boiler tubes 80 to header 81, then to second manifold 83, via the plurality of piping links 82. The second manifold 83 may receive the steam and in turn may pass the steam to HP steam drum 74 via steam conduits 84 of boiler module 72. In other non-limiting examples, steam may be provided through boiler module 72 in a similar manner as discussed herein. In those non-limiting examples, exhaust fluid 60 may increase the heat of the steam flowing through boiler module 72.

In other non-limiting examples (not shown) where boiler module 72 is formed as an evaporator, economizer, superheater, and/or reheater, boiler module 72 may include distinct components as those discussed herein. However, it is understood that each of these distinct configurations for boiler module 72 of HRSG 54 may share at least some similar features and/or components, including, for example, the plurality of boiler tubes 80, manifolds 78,83, header 81, and/or the plurality of piping links 82.

Additionally as shown in FIG. 2, HRSG 54 may also include an enclosure 100. As discussed herein, enclosure 100 of HRSG 54 may substantially enclose and/or surround components of boiler module 72 (e.g., first manifold 78, piping links 82, second manifold 83, steam conduits 84) of HRSG 54. In the non-limiting example shown in FIG. 2, and as discussed in detail herein, enclosure 100 may substantially enclose second manifold 83 of HRSG 54. Additionally as discussed herein, enclosure 100 of HRSG 54, along with additional components and/or systems of HRSG 54, may reduce stress experienced by components of boiler module 72 of HRSG 54 during operation.

Figure 3:
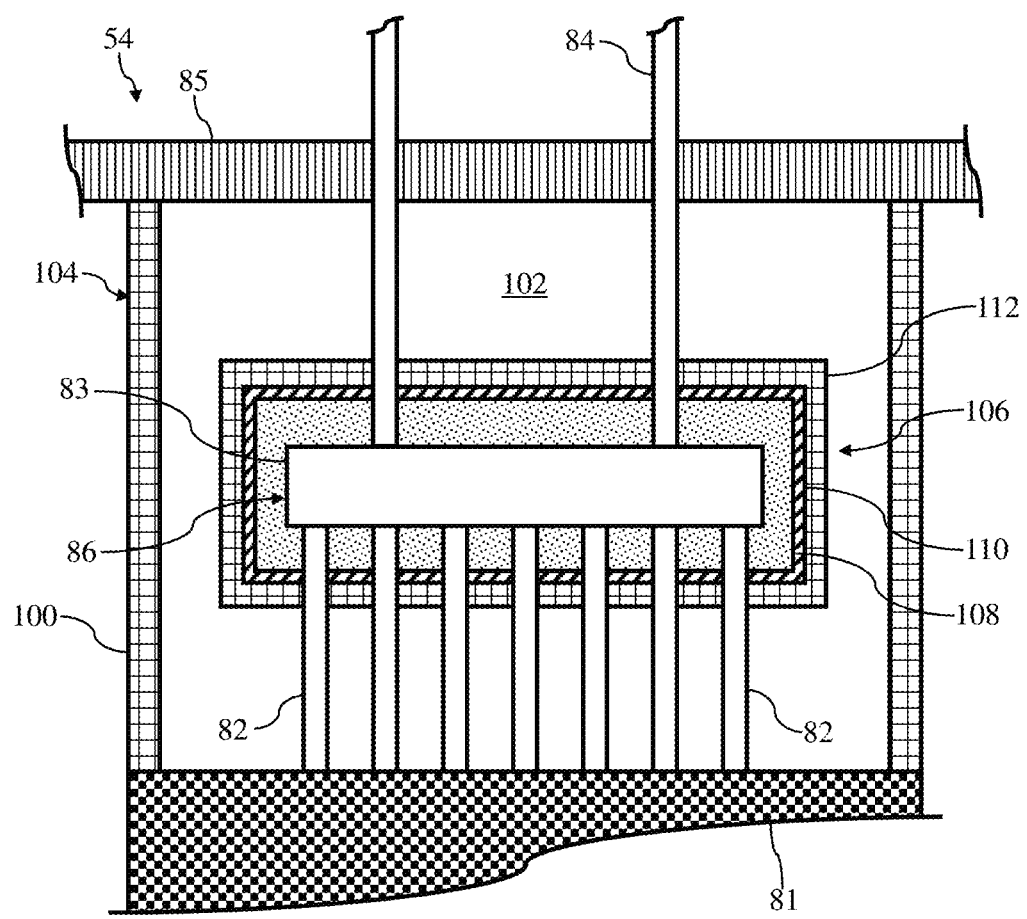
FIG. 3 shows a portion the HRSG of FIG. 2 including an enclosure surrounding a manifold of the HRSG, and a thermal element(s) positioned within the enclosure and surrounding the manifold, according to embodiments.

Turning to FIG. 3, a portion of boiler module 72 (see, FIG. 2) and enclosure 100 of HRSG 54 (see, FIG. 2) is shown. Specifically, FIG. 3 shows a portion of header 81, the plurality of piping links 82, second manifold 83, and a portion of steam conduits 84 of boiler module 72, a portion of housing 85 of HRSG 54, and enclosure 100. Enclosure 100 may enclose a portion of the components of boiler module 72. That is for example, enclosure 100 may enclose and/or surround the entirety of second manifold 83, such that second manifold 83 may be positioned within a cavity, chamber and/or interior 102 (hereafter, "interior 102") of enclosure 100. Additionally, enclosure 100 may enclose and/or surround at least a portion of the plurality of piping links 82 and steam conduits 84 in fluid communication with and/or extending from second manifold 83. As shown in the non-limiting example of FIG. 3, enclosure 100 may be positioned between header 81 and housing 85 of HRSG 54. Specifically, enclosure 100 may be positioned between, coupled to, and/or at least partially surround or enclosure a portion of header 81 and housing 85, respectively. As a result, interior 102 of enclosure 100 may also be defined and/or bound by header 81 and housing 85 of HRSG 54, as shown in FIG. 3.

Additionally as shown in FIG. 3, enclosure 100 may enclose and/or encapsulate the entirety of the plurality of piping links 82, but may not enclose or encapsulate the entirety of steam conduits 84. As such, steam conduits 84 may extend and/or pass through housing 85 of HRSG 54, and only a portion of steam conduits 84 may be positioned within interior 102 of enclosure 100. In a non-limiting example shown in FIG. 3, enclosure 100 may include a body 104 formed from and/or filled with a thermally insulative material or a material including thermal insulating properties or characteristics. Forming body 104 of enclosure 100 from thermally insulative material may aid in insulating and/or maintaining heat within enclosure 100 during operation of HRSG 54, which in turn may reduce the thermal stress experienced by second manifold 83, as discussed herein. Thermally insulative material may include any suitable material that may thermally insulate and/or maintain heat within enclosure 100 including, but not limited to, fiberglass, polymer-based foams, glass, mineral wool, calcium silicate, ceramics, and the like.

As shown in FIG. 3, HRSG 54 may also include at least one thermal element 106. Thermal element(s) 106 may be positioned within enclosure 100. That is, thermal element(s) 106 of HRSG 54 may be positioned within interior 102, and may be substantially enclosed or surrounded by enclosure 100. In the non-limiting example shown in FIG. 3, thermal element(s) 106 may surround second manifold 83 of boiler module 72 (see, FIG. 2). Specifically, thermal element(s) 106 may surround, enclose, encircle, and/or encase the entirety of second manifold 83, such that second manifold 83 may not be exposed within interior 102 of enclosure 100. Additionally, thermal element(s) 106 may surround at least some of the portion of the plurality of piping links 82 and steam conduits 84 positioned within interior 102 of enclosure 100. As discussed herein, thermal element(s) 106 positioned within enclosure 100 and surrounding manifold 83 may thermally insulate and/or provide conductive heat to second manifold 83 during operation of HRSG 54, which in turn may reduce the thermal fatigue stress experienced by second manifold 83.

In the non-limiting example shown in FIG. 3, thermal element(s) 106 may be formed from a plurality of distinct components. That is, thermal element(s) 106 may be formed from and/or may include a heat storage component 108 positioned within a casing 110. Heat storage component 108 may directly contact and surround second manifold 83. Specifically, heat storage component 108 may directly contact and/or surround an outer surface 86 of second manifold 83. In the non-limiting example, heat storage component 108 may substantially fill casing 110, such that no portion of outer surface 86 of second manifold 83 is untouched or uncovered by heat storage component 108 of thermal element(s) 106. Casing 110 may hold heat storage component 108 in place around second manifold 83 and/or may provide a ridge structure for storing heat storage component 108. As shown in FIG. 3, casing 110 may substantially surround second manifold 83. Additionally, the plurality of piping links 82 and steam conduits 84 coupled to and/or in fluid communication with second manifold 83 may also extend and/or pass through casing 110.

As discussed herein, heat storage component 108 may be formed from thermally conductive material, a material including thermal conductive properties or characteristics, and/or materials including heat storage properties or capabilities. For example, heat storage component 108 forming a portion of thermal element(s) 106 may be formed as eutectic salts including, but not limited to, sodium nitrate, potassium nitrate or calcium nitrate. In other non-limiting examples, heating storage component 108 may be formed from additional materials including, but not limited to, metals, metal alloys, graphite, and any other suitable material that may include thermal conductive properties or characteristics, and/or heat storage properties or capabilities. In further non-limiting examples, heating storage component 108 may be formed from a material that has thermal conductive properties or characteristics, and/or heat storage properties or capabilities, and may be in a fluid or liquid state when heated and/or after receiving heat from second manifold 83, as discussed herein.

Additionally, casing 110 of thermal element(s) 106, which holds or stores thermally conductive heat storage component 108, may be formed from a thermally insulative material, similar to enclosure 100, or alternatively, may be formed from a thermally conductive material similar to conductive heat storage component 108. For example, casing 110 may be formed from thermally insulative material including, but not limited to, fiberglass, polymer-based foams, glass, mineral wool, calcium silicate, ceramics, and the like, or may be formed from thermally conductive material including, but not limited to, metals, metal alloys, and the like. The thermally conductive/insulative/heat storage properties of the material used to form heat storage component 108 and/or casing 110 may aid in the reduction of the thermal stress experienced by second manifold 83, as discussed herein.

In the non-limiting example shown in FIG. 3, thermal element(s) 106 may also include a thermally insulative shell 112. Thermally insulative shell 112 may be positioned within interior 102 of enclosure 100 and may substantially surround casing 110 containing and/or storing heat storage component 108. In the non-limiting example shown in FIG. 3, thermally insulative shell 112 may substantially contact, be coupled to, and/or cover casing 110 of thermal element(s) 106. Similar to casing 110, thermally insulative shell 112 may substantially surround second manifold 83, and the plurality of piping links 82 and steam conduits 84 coupled to and/or in fluid communication with second manifold 83 may extend and/or pass through thermally insulative shell 112. Thermally insulative shell 112 may be formed from a thermally insulative material or a material including thermal insulating properties or characteristics including, but not limited to, fiberglass, polymer-based foams, glass, mineral wool, calcium silicate, ceramics, and the like. As discussed herein, forming insulative shell 112 from a thermally insulative material may aid in reducing the thermal stress experienced by second manifold 83 during operation of HRSG 54.

During a start-up procedure of power plant system 12, and specifically when HRSG 54 initially begins to generate steam, second manifold 83, which may be at reduced or pre-start temperature (e.g., ambient temperature), may be immediately exposed to high temperature steam. Second manifold 83 may undergo a rapid temperature change and/or an increase in temperature as a result of being exposed to high temperature steam. For example, an internal surface and/or portion of second manifold 83 may be rapidly heated by the high temperature steam, while the external surface and/or portion of second manifold 83 may remain at the pre-start temperature and/or may only be gradually heated. Enclosure 100 and thermal element(s) 106 may aid in reducing the thermal stress experienced by second manifold 83 (e.g., internal surface vs. external surface) during the start-up procedure. Specifically, because of the thermally conductive/insulative/heat storage properties of the material used to form enclosure 100 and thermal element(s) 106, the thermal stress experienced by second manifold 83 during the start-up procedure may be reduced and/or eliminated. For example, when second manifold 83 is exposed to the high temperature steam and begins to undergo the rapid temperature change or increase, a portion of the heat may be transferred to and/or conducted by heat storage component 108 of thermal insulating element(s) 106. That is, because of the thermally conductive properties of heat storage component 108 contacting second manifold 83 directly, a portion of the heat experienced by second manifold 83 from the generation and/or exposure to the high temperature steam may be transferred, conducted, and/or dissipated through heat storage component 108. Additionally, and as discussed herein, this heat transferred and/or conducted by heat storage component 108 may also be stored by heat storage component 108 to be provided to second manifold 83 at another time and/or at a distinct operational start-up of HRSG 54. Furthermore, where casing 110 containing heat storage component 108 is formed from a thermally conductive material, casing 110 may also receive and/or conduct a portion of the heat experienced by second manifold 83.

Enclosure 100, thermally insulative shell 112, and casing 110, when formed from thermally insulative material, may also aid in reducing the thermal stress experienced by second manifold 83 during the start-up procedure. For example, the thermally insulative material and/or properties of enclosure 100, thermally insulative shell 112 and casing 110 (where applicable) may maintain the heat within enclosure 100. Specifically, enclosure 100 including body 104 formed from thermally insulative material may insulate interior 102 and/or may maintain any heat experienced by second manifold 83 and conducted to thermal element(s) 106 within enclosure 100 and/or interior 102. Additionally, thermally insulative shell 112, and casing 110 when applicable, formed from thermally insulative material may insulate the remaining components of thermal element(s) 106 and/or may maintain any heat experienced by second manifold 83 and conducted to thermal element(s) 106 within thermal element(s) 106. For example, thermally insulative shell 112 (and casing 110) may substantially insulate heat storage component 108 which may be conducting heat from second manifold 83 during the start-up procedure.

In another non-limiting example, enclosure 100 and thermal element(s) 106 may aid in reducing the thermal stress experienced by second manifold 83 during a subsequent start-up procedure following a shutdown of power plant system 12. That is, power plant system 12 may be shutdown and operation may be stopped temporarily. As a result, HRSG 54 may temporarily stop operating, and therefore, no high temperature steam may be generated by and/or supplied to boiler module 72 including second manifold 83. Without the use of enclosure 100 and thermal element(s) 106, the temperature of second manifold 83 may begin to decrease when power plant system 12 is temporarily shutdown.

However, because of the thermally conductive/insulative/heat storage properties of the material used to form enclosure 100 and thermal element(s) 106, the temperature of second manifold 83 may be maintained at the higher operational temperature or may only be slightly reduced from the operational temperature. For example, as a result of heat storage component's 108 thermally conductive properties, and/or heat storage component's 108 ability to store the heat transferred and/or conducted from second manifold 83 during start-up/operation, heat storage component 108 of thermal element(s) 106 may transfer, conduct, and/or maintain heat exposure to second manifold 83 during the shutdown of power plant system 12. Additionally, the thermally insulative properties of enclosure 100, thermally insulative shell 112, and casing 110 when formed from thermally insulative material, may aid in maintaining second manifold 83 at the higher operational temperature or only allowing the temperature of manifold 83 to drop slightly lower (e.g., approximately 20° C. to 50° C.) from the operational temperature during the shutdown of power plant system 12. Specifically, enclosure 100, thermally insulative shell 112, and casing 110 may maintain the heat generated by and transferred from second manifold 83 during operation and/or insulate second manifold 83 and interior 102 including second manifold 83 during the shutdown of power plant system 12. As a result of maintaining second manifold 83 at the higher operational temperature or only allowing the temperature of manifold 83 to drop slightly lower during the shutdown of power plant system 12, when power plant system 12 becomes operational after the shutdown, the temperature change experienced by second manifold 83 may not be as rapid and/or drastic, if at all, when second manifold 83 initially receives high temperature steam.

Figure 4:
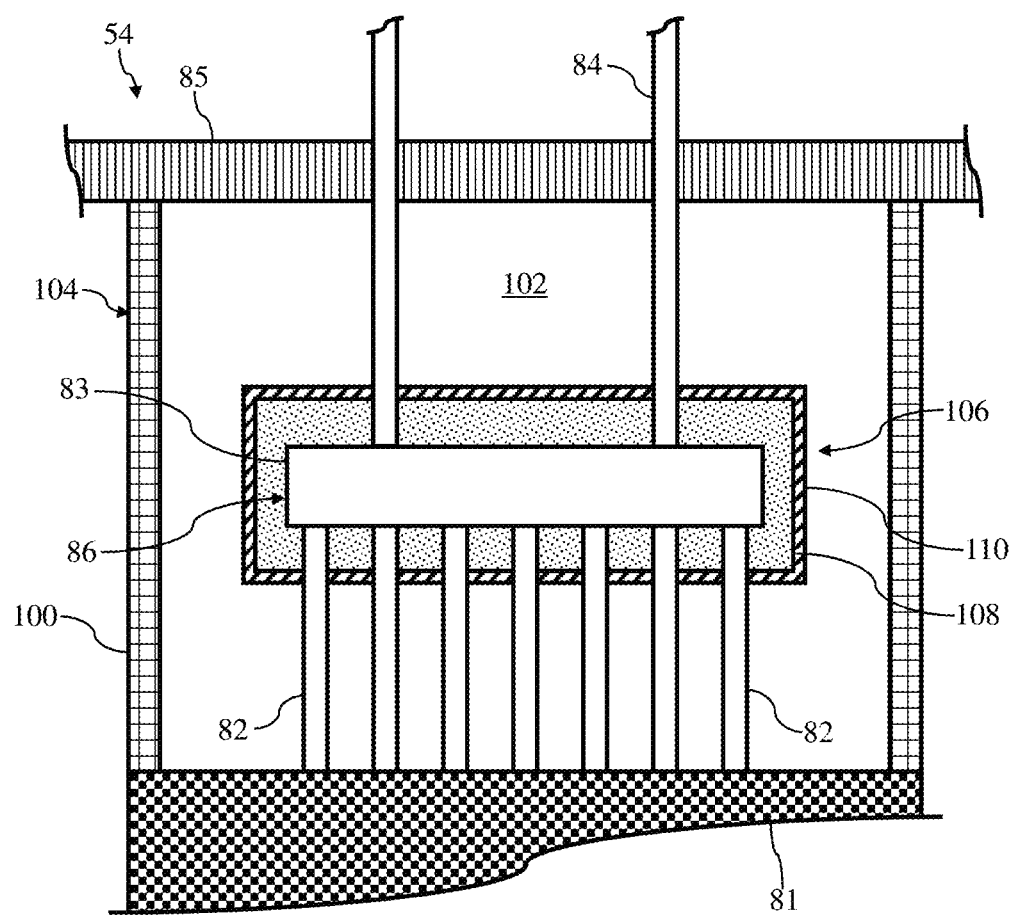
FIGS. 4 and 5 show a portion the HRSG of FIG. 2 including an enclosure surrounding a manifold of the HRSG, and a thermal element(s) positioned within the enclosure and surrounding the manifold, according to various embodiments.
Figure 5:
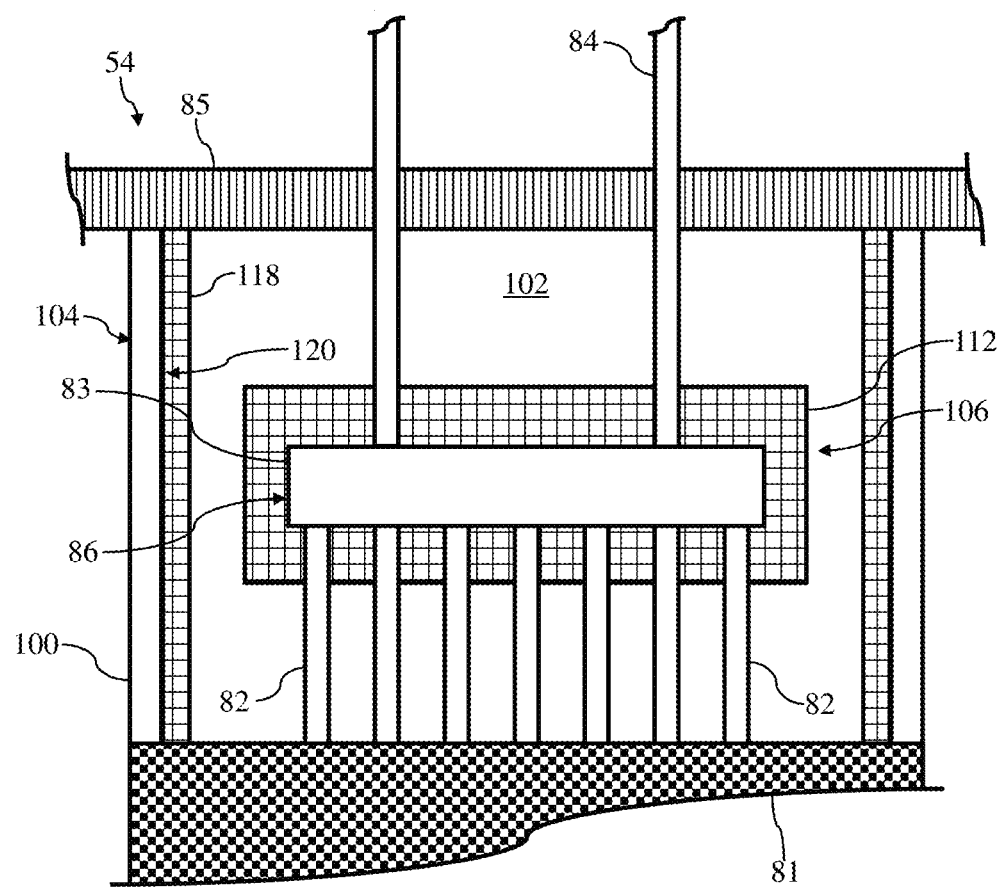

FIGS. 4 and 5 show additional non-limiting examples of second manifold 83, a portion of the plurality of piping links 82, a portion of steam conduits 84, enclosure 100, and thermal element(s) 106. Specifically in FIGS. 4 and 5, enclosure 100 and thermal element(s) 106 of HRSG 54 (see, FIG. 1) may include distinct and/or unique components/configurations compared to the non-limiting example shown and discussed herein with respect to FIG. 3.

For example, as shown in FIG. 4, thermal element(s) 106 may only include heat storage component 108 and casing 110. That is, and with comparison to the non-limiting example of FIG. 3, thermal element(s) 106 shown in FIG. 4 may include heat storage component 108 and casing 110, and may not include thermally insulative shell 112. In the non-limiting example, heat storage component 108 may be formed from a thermally conductive material, may include a material having thermally conductive characteristics and/or properties, and/or may include a material having heat storage properties and/or capabilities. Additionally, and because thermal element(s) 106 does not include thermally insulative shell 112, casing 110 surrounding and/or containing heat storage component 108 may be formed from a thermally insulating material and/or may include a material having thermal insulating characteristics and/or properties.

In the non-limiting example shown in FIG. 5, thermal element(s) 106 may only include thermally insulative shell 112. That is, and distinct from the non-limiting example of FIG. 4, thermal element(s) 106 shown in FIG. 5 may include thermally insulative shell 112, and may not include heat storage component 108 and casing 110. In this non-limiting example, thermally insulative shell 112 may directly contact and/or surround an outer surface 86 of second manifold 83. As discussed herein, thermally insulative shell 112 may be formed from a thermally insulating material and/or may include a material having thermal insulating characteristics and/or properties. In this non-limiting example, and as a result of thermal element(s) 106 only including thermally insulative shell 112, thermally insulative shell 112 may reduce the thermal stress experienced by second manifold 83 by substantially insulating second manifold 83 during operation of HRSG 54, as discussed herein.

Additionally as shown in the non-limiting example of FIG. 5, HRSG 54 may include additional components. For example, HRSG 54 may also include a thermally insulative layer 118. Thermally insulative layer 118 may be positioned on inner surface 120 of body 104 of enclosure 100. Specifically, thermally insulative layer 118 may substantially line inner surface 120, such that thermally insulative layer 118 substantially surrounds interior 102 of enclosure 100. As shown in the non-limiting example in FIG. 5, body 104 of enclosure 100 may not be formed from a thermally insulating material, but rather, thermally insulative layer 118 may be formed from a thermally insulating material and/or a material that includes thermal insulating characteristics and properties. In another non-limiting example (not shown), both body 104 of enclosure 100 and thermally insulative layer 118 may be formed from thermally insulating materials and/or materials that include thermal insulating characteristics and properties. Similar to body 104 of enclosure 100, thermally insulative layer 118 may include any suitable material that may thermally insulate and/or maintain heat within enclosure 100 including, but not limited to, fiberglass, polymer-based foams, glass, mineral wool, calcium silicate, ceramics, and the like.

Figure 6:
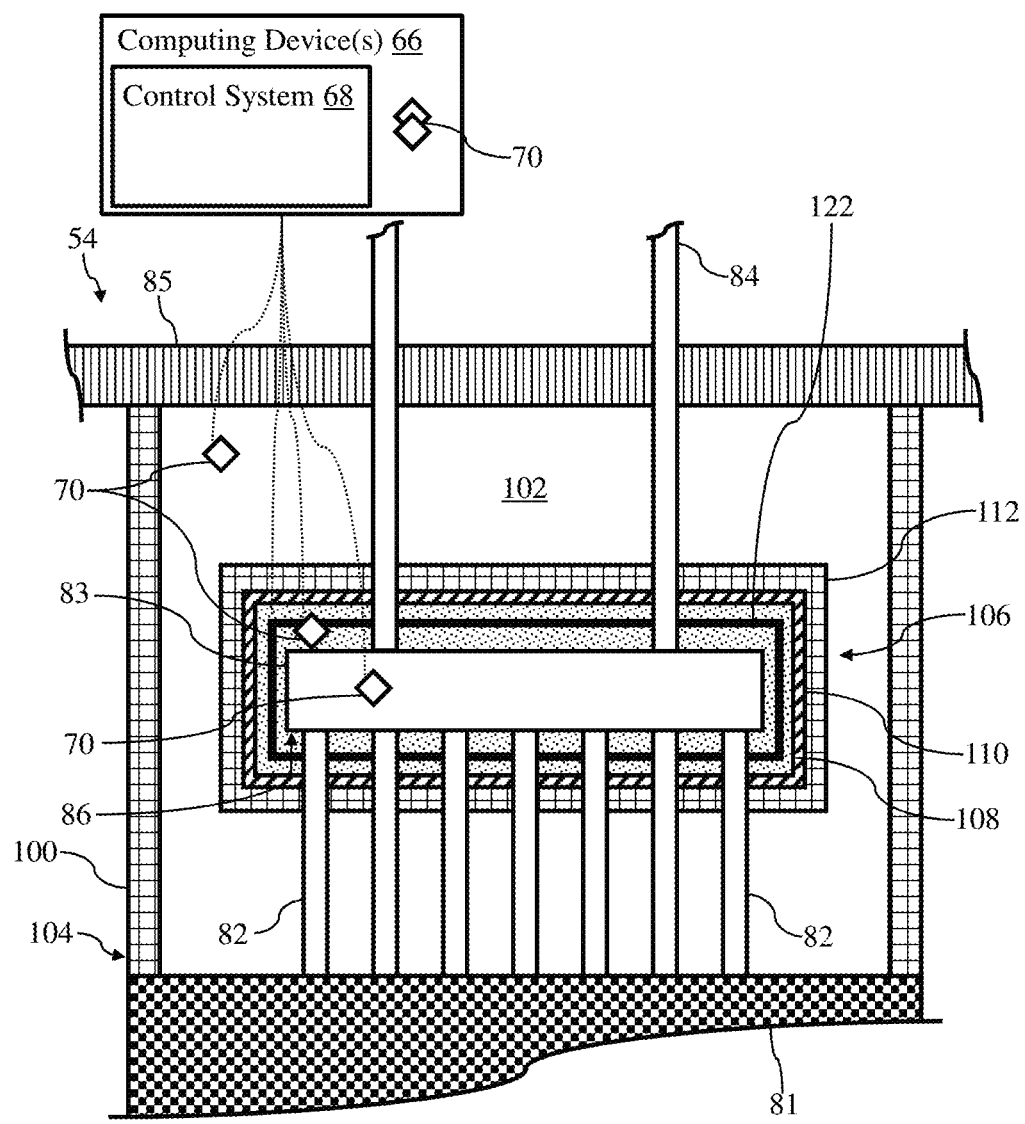
FIG. 6 shows a portion of HRSG including the enclosure and the thermal element(s) of FIG. 3, and a heating component positioned within the thermal element(s), according to embodiments.
Figure 7:
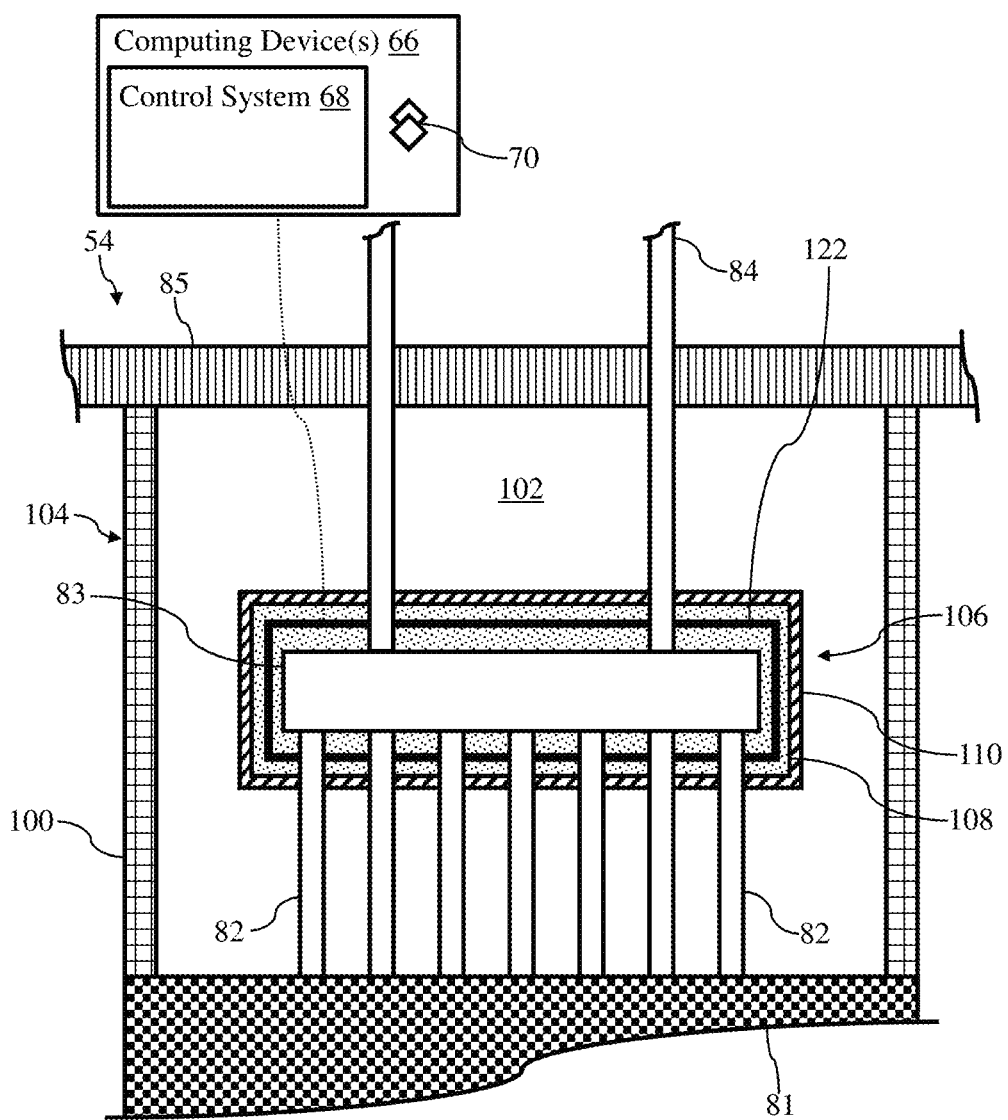
FIG. 7 shows a portion of HRSG including the enclosure and the thermal element(s) of FIG. 4, and a heating component positioned within the thermal element(s), according to additional embodiments.

FIGS. 6 and 7 show additional non-limiting examples of second manifold 83 surrounded by enclosure 100, thermal element(s) 106, and a heating component 122. In the non-limiting examples, heating component 122 may be positioned within casing 110 containing heat storage component 108. Specifically, heating component 122 may be positioned within casing 110 and may be substantially surrounded by and/or immersed within heat storage component 108 contained within casing 110. Additionally, heating component 122 immersed within heat storage component 108 may be positioned between and separated from second manifold 83 and casing 110, respectively. As shown in the non-limiting examples of FIGS. 6 and 7, heating component 122 may also (at least partially) surround second manifold 83. In other non-limiting examples (not shown), heating component 122 may include a plurality of distinct components that may be positioned and/or immersed within heat storage component 108 and positioned in various positions all around second manifold 83. Heating component 122 may be any suitable heating component or system that may provide heat to heat storage component 108, which in turn may transfer the heat generated by heating component 122 to second manifold 83, as discussed herein. In non-limiting examples, heating component 122 may be an electric heating coil. In other non-limiting examples, heating component 122 may be formed as, for example, externally supplied steam, hot water, heated air, exhaust fluid 60 from GT system 30, and the like. Additionally in a non-limiting example (not shown), heat storage component 108 may be heated externally and/or outside of enclosure 100 and may be subsequently positioned within and/or circulated to enclosure 100 to provide heat to second manifold 83, as discussed herein.

Heating component 122 of HRSG 54 may be utilized to aid in the reduction of the thermal stress experienced by second manifold 83 during operation of HRSG 54, and/or improve operational reliability of power plant system 12. For example, heating component 122 immersed in heat storage component 108 may provide supplemental or auxiliary heat, independent of that generated by high temperature steam, to heat storage component 108 during operation of HRSG 54, which in turn may heat second manifold 83. Prior to performing a start-up procedure, heating component 122 may generate and/or provide supplemental or auxiliary heat to heat storage component 108 which in turn may be provided to second manifold 83. As such, the temperature of second manifold 83 may be increased prior HRSG 54 becoming operational and high temperature steam being generated within boiler module 72 (see, FIG. 2) and provided to second manifold 83, as discussed herein, resulting in reduced rate of thermal heating and improved fatigue lifetime of second manifold 83. Additionally, heating component 122 may provide supplemental or auxiliary heat to heat storage component 108, and ultimately second manifold 83, to ensure second manifold may be at a desired temperature during operation of HRSG 54. As discussed herein, the desired temperature may correlate to a predetermined temperature that may substantially minimize or eliminate any transfer of heat from the high temperature steam generated by HRSG 54 and second manifold 83. Heating component 122 substantially surrounding second manifold 83 may utilize the thermally conductive material and/or characteristics of heat storage component 108 to provide a uniform heat to heat storage component 108, and consequently second manifold 83, as discussed herein.

As shown in FIGS. 6 and 7, computing device(s) 66, and more specifically, control system 68 of computing device(s) 66, may be operably coupled to and/or in electronic communication with heating component 122. Control system 68 of computing device(s) 66 may be configured to activate and/or control the operation of heating component 122. That is, and as discussed herein with respect to the non-limiting example of FIG. 1, computing device(s) 66 may be configured to control operation of the various portions of power plant system 12, including heating component 122 of HRSG 54. Control system 68 may activate and/or control operation of heating component 122 to aid in the reduction of the thermal stress experienced by second manifold 83 during operation of HRSG 54, and/or improve operational reliability of power plant system 12, as discussed herein.

To help in the activation and/or control of heating component 122, control system 68 may also utilize information obtained by sensor(s) 70 positioned with HRSG 54. As discussed herein with respect to FIG. 1, HRSG 54 may include sensor(s) 70 of computing device(s) 66 positioned therein. In the non-limiting example shown in FIG. 6, sensor(s) 70 may be positioned within enclosure 100 included within HRSG 54. More specifically, sensors 70 may be positioned within interior 102 of enclosure 100, within second manifold 83, and within thermal element(s) 106. Sensor 70 positioned within thermal element(s) 106 may, for example, be immersed or suspended within heat storage component 108 of thermal element(s) 106. In another non-limiting example, or in addition to being immersed in heat storage component 108, sensor 70 positioned within thermal element(s) 106 may also contact and/or be coupled to outer surface 86 of second manifold 83.

As discussed herein, sensors 70 positioned within enclosure 100 in HRSG 54 may be configured to detect and/or determine a fluid or surface temperature. In the non-limiting examples shown in FIG. 6, sensor 70 positioned within interior 102 of enclosure 100 may detect the ambient temperature of interior 102, and sensor 70 positioned within second manifold 83 of the HRSG 54 may detect the temperature within second manifold 83, the temperature of steam received within second manifold 83 (during operation), and/or the temperature of the internal surface of second manifold 83. Additionally, sensor 70 immersed within heat storage component 108 of thermal element(s) 106 may detect the temperature of heat storage component 108. Additionally, sensor 70 may be coupled to and/or contact second manifold 83, to detect the temperature of outer surface 86 of second manifold 83. The temperatures detected by the various sensors 70 positioned within enclosure 100 in HRSG 54 may be provided to computing device(s) 66, and specifically control system 68. Using the sensor detected temperatures, control system 68 may activate and/or adjust the operation of heating component 122 to aid in the reduction of the thermal stress experienced by second manifold 83, and/or improve operational reliability of power plant system 12, as discussed herein.

It is understood that the number of sensors 70 shown in FIG. 6 as being positioned within enclosure 100 of HRSG 54 is merely illustrative. As such, computing device(s) 66 may include more or less sensors 70 positioned within enclosure 100 to aid in the reduction of the thermal stress experienced by second manifold 83, and/or improve operational reliability of power plant system 12, as discussed herein. Additionally, although sensors 70 are only shown in FIG. 6, it is understood that sensor(s) 70 may be included in any of the non-limiting examples discuss herein with respect to FIGS. 3-7.

Figure 8:
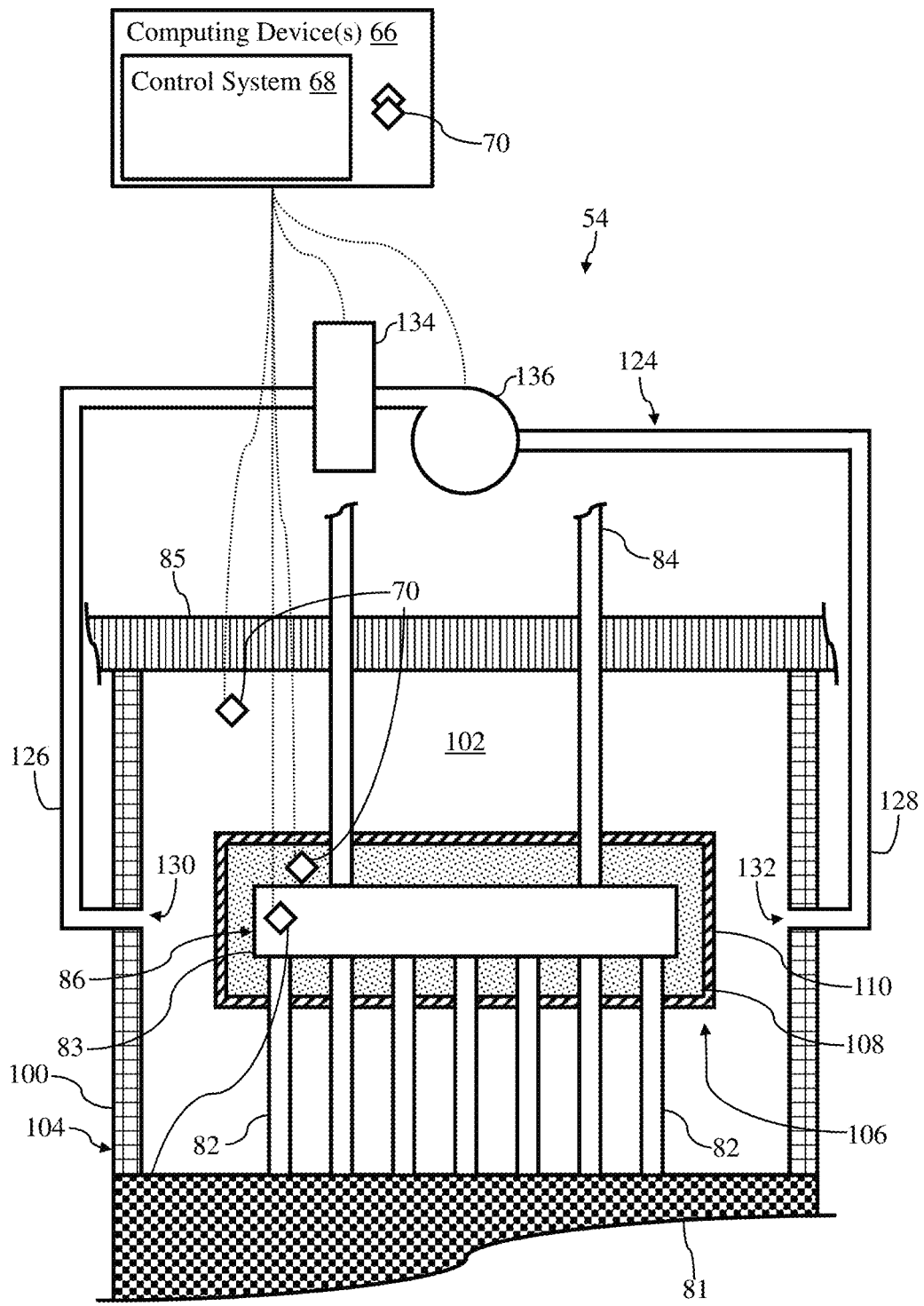
FIG. 8 shows a portion the HRSG including the enclosure and the thermal element(s) of FIG. 4, and a supplemental heating system in fluid communication with the enclosure, according to embodiments.

FIG. 8 shows another non-limiting example of a portion of HRSG 54 including enclosure 100 and thermal element(s) 106 as previously discussed herein with respect to FIG. 4, as well as a supplemental heating system 124. Specifically, FIG. 8 shows an additional non-limiting example of second manifold 83 surrounded by enclosure 100, thermal element(s) 106, and supplemental heating system 124 in fluid communication with enclosure 100. It is understood that similarly numbered and/or named components may function in a substantially similar fashion. Redundant explanation of these components has been omitted for clarity.

In the non-limiting example shown in FIG. 8, HRSG 54 may include supplemental heating system 124 in fluid communication with interior 102 of enclosure 100. Specifically, supplemental heating system 124 may include an inlet conduit 126 and an outlet conduit 128 in fluid communication with interior 102 of enclosure 100. In the non-limiting example shown in FIG. 8, inlet conduit 126 may be formed through enclosure 100 and/or may include an inlet opening 130 formed in body 104 of enclosure 100. Additionally, outlet conduit 128 may be formed through enclosure 100 and/or may include an outlet opening 132 formed in body 104. As shown in the non-limiting example, only a portion of inlet conduit 126 and outlet conduit 128 may positioned within housing 85 of HRSG 54 configured to receive exhaust fluid 60 (see, FIG. 2), house boiler module 72 (see, FIG. 2) and enclosure 100, respectively. As such, a distinct portion of inlet conduit 126 and outlet conduit 128, as well as other components of supplemental heating system 124 as discussed herein, may be positioned outside of housing 85 of HRSG 54. As discussed herein, inlet conduit 126 and outlet conduit 128 may be in fluid communication with interior 102 of enclosure 100 to provide heated fluid to or remove heated fluid from interior 102 of enclosure 100.

As shown in FIG. 8, supplemental heating system 124 may also include a heater 134. Heater 134 of supplemental heating system 124 may be in fluid communication with inlet conduit 126. That is, inlet conduit 126 in fluid communication with interior 102 of enclosure 100 may also be in fluid communication with and positioned downstream of heater 134 of supplemental heating system 124 to provide heated fluid (e.g., air, exhaust fluid 60) generated by heater 134 to interior 102 of enclosure 100. Additionally, and as shown in the non-limiting example of FIG. 8, heater 134 may be positioned outside of housing 85 of HRSG 54. Heater 134 may be any suitable heating device, or heating system that may heat fluid and provide the heated fluid to inlet conduit 126.

To aid in the flowing of heated fluid through inlet conduit 126 to interior 102, supplemental heating system 124 may also include a blower 136. As shown in FIG. 8, blower 136 may be in fluid communication with heater 134. More specifically, blower 136 may be in fluid communication with and may be positioned upstream of heater 134. Additionally, and as a result of being positioned upstream of heater 134, blower 136 may also be positioned upstream of inlet conduit 126. Similar to heater 134, blower 136 may be positioned outside of housing 85 of HRSG 54. In the non-limiting shown in FIG. 8, outlet conduit 128 may also be in fluid communication with blower 136. That is, outlet conduit 128 may be in fluid communication with and positioned upstream of blower 136. As a result, the non-limiting example of supplemental heating system 124 shown in FIG. 8 may be a substantially closed circuit or system. That is, the fluid heated by heater 134 and provided to interior 102 of enclosure 100 via inlet conduit 126 may be removed from enclosure 100 via outlet conduit 128 and subsequently supplied and/or recycled to heater 134 again using blower 136. Blower 136 may be any suitable device, or system that may draw fluid through outlet conduit 128 and move fluid through heater 134 and inlet conduit 126, respectively. For example, blower 136 of supplemental heating system 124 may be a centrifugal fan.

Similar to heating element 122 discussed herein with respect to FIGS. 6 and 7, supplemental heating system 124 may aid in the reduction of the thermal stress experienced by second manifold 83, and/or improve operational reliability of power plant system 12. For example, supplemental heating system 124 may provide supplemental or auxiliary heat, independent of that generated by high temperature steam, to interior 102 of enclosure 100 during operation of HRSG 54, which in turn may heat second manifold 83. Specifically, where heat storage component 108 and casing 110 are both formed from thermally conductive material and/or material having heat storage properties or capabilities, heated fluid generated by heater 134 of supplemental heating system 124 may be provided to interior 102 of enclosure 100 via inlet conduit 126. The heated fluid provided to interior 102 may pass over, contact, and/or transfer heat to, in order, casing 110, heat storage component 108, and second manifold 83. Also similar to heating component 122, and prior to performing a start-up procedure, supplemental heating system 124 may generate and/or provide supplemental or auxiliary heat to interior 102 of enclosure 100, which may ultimately result in heating second manifold 83, as discussed herein. As such, the temperature of second manifold 83 may be increased prior HRSG 54 becoming operational and high temperature steam being generated within boiler module 72 and provided to second manifold 83, as discussed herein. Additionally, supplemental heating system 124 may provide supplemental or auxiliary heat to interior 102 of enclosure 100, and ultimately second manifold 83, to ensure second manifold 83 may be at a desired temperature during operation of HRSG 54. As discussed herein, the desired temperature may correlate to a predetermined temperature that may substantially minimize or eliminate any transfer of heat from the high temperature steam generated by HRSG 54 and second manifold 83.

Additionally as shown in FIG. 8, and similar to heating component 122 of FIG. 6, computing device(s) 66, and more specifically, control system 68 of computing device(s) 66, may be operably coupled to and/or in electronic communication with heater 134 and blower 136 of supplemental heating system 124. Control system 68 of computing device(s) 66 may be configured to activate and/or control the operation of heater 134 and/or blower 136, respectively. Control system 68 may activate and/or control operation of heater 134 and blower 136 of supplemental heating system 124 to aid in the reduction of the thermal stress experienced by second manifold 83 during operation of HRSG 54, and/or improve operational reliability of power plant system 12, as discussed herein.

Also similar to the non-limiting example shown and discussed herein with respect to FIG. 6, control system 68 may utilize information obtained by sensor(s) 70 positioned with HRSG 54 to help in the activation and/or control of supplemental heating system 124. As shown in FIG. 8, sensors 70 may be positioned within interior 102 of enclosure 100, within second manifold 83, and immersed or suspended within heat storage component 108 and/or contacting outer surface 86 of second manifold 83. Sensor 70 positioned within interior 102 of enclosure 100 may detect the ambient temperature of and/or heated fluid supplied by inlet conduit 126 to interior 102. Sensor 70 positioned within second manifold 83 of the HRSG 54 may detect the temperature within second manifold 83 and/or the temperature of steam received within second manifold 83 (during operation). Additionally, and as discussed herein, sensor 70 immersed within heat storage component 108 of thermal element(s) 106 may detect the temperature of heat storage component 108 and/or the temperature of outer surface 86 of second manifold 83. The temperatures detected by the various sensors 70 positioned within enclosure 100 in HRSG 54 may be provided to computing device(s) 66, and specifically control system 68. Using the sensor detected temperatures, control system 68 may activate and/or adjust the operation of heater 134 and/or blower 136 of supplemental heating system 124 to aid in the reduction of the thermal stress experienced by second manifold 83, and/or improve operational reliability of power plant system 12, as discussed herein.

Figure 9:
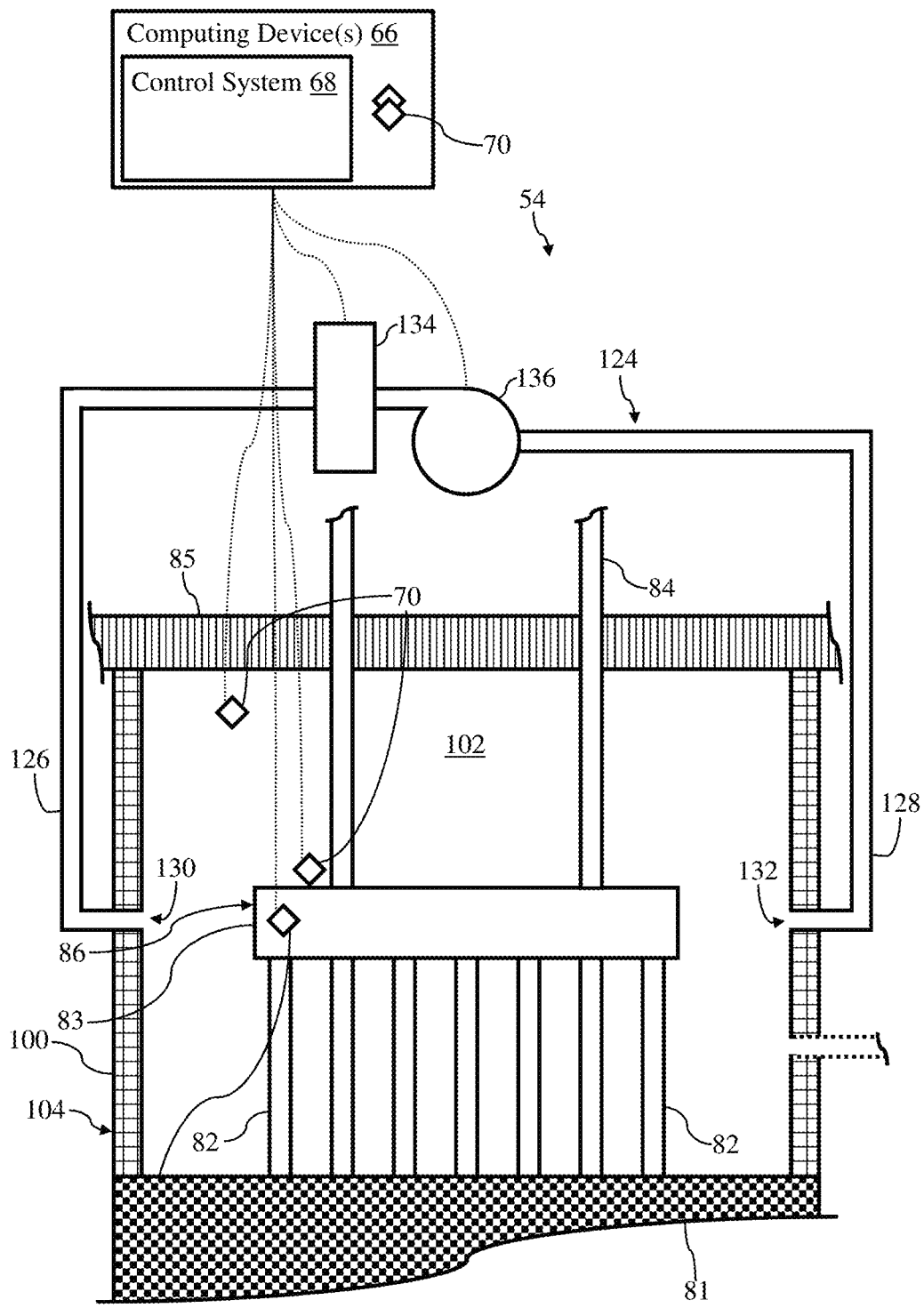
FIG. 9 shows a portion the HRSG of FIG. 2 including an enclosure surrounding a manifold of the HRSG, and a supplemental heating system in fluid communication with the enclosure, according to embodiments.

FIG. 9 shows another non-limiting example of a portion of HRSG 54 including enclosure 100 and supplemental heating system 124, similar to the non-limiting example discussed herein with respect to FIG. 8. However, distinct from the example shown in FIG. 8, the non-limiting example shown in FIG. 9 may not include thermal element(s) 106. As a result, and distinct from the examples discussed herein with respect to FIGS. 3-8, outer surface 86 of second manifold 83 may be exposed within interior 102 of enclosure 100. As a result, when supplemental heating system 124 provides heated fluid to interior 102, the heated fluid may contact and/or heat outer surface 86 of second manifold 83 directly in order to aid in the reduction of the thermal stress experienced by second manifold 83, and/or improve operational reliability of power plant system 12, as discussed herein. Additionally distinct from the examples discussed herein (e.g., FIGS. 6 and 8), sensor 70 positioned directly adjacent to and contacting outer surface 86 of second manifold 83 may only detect the temperature of outer surface 86.

Figure 10:
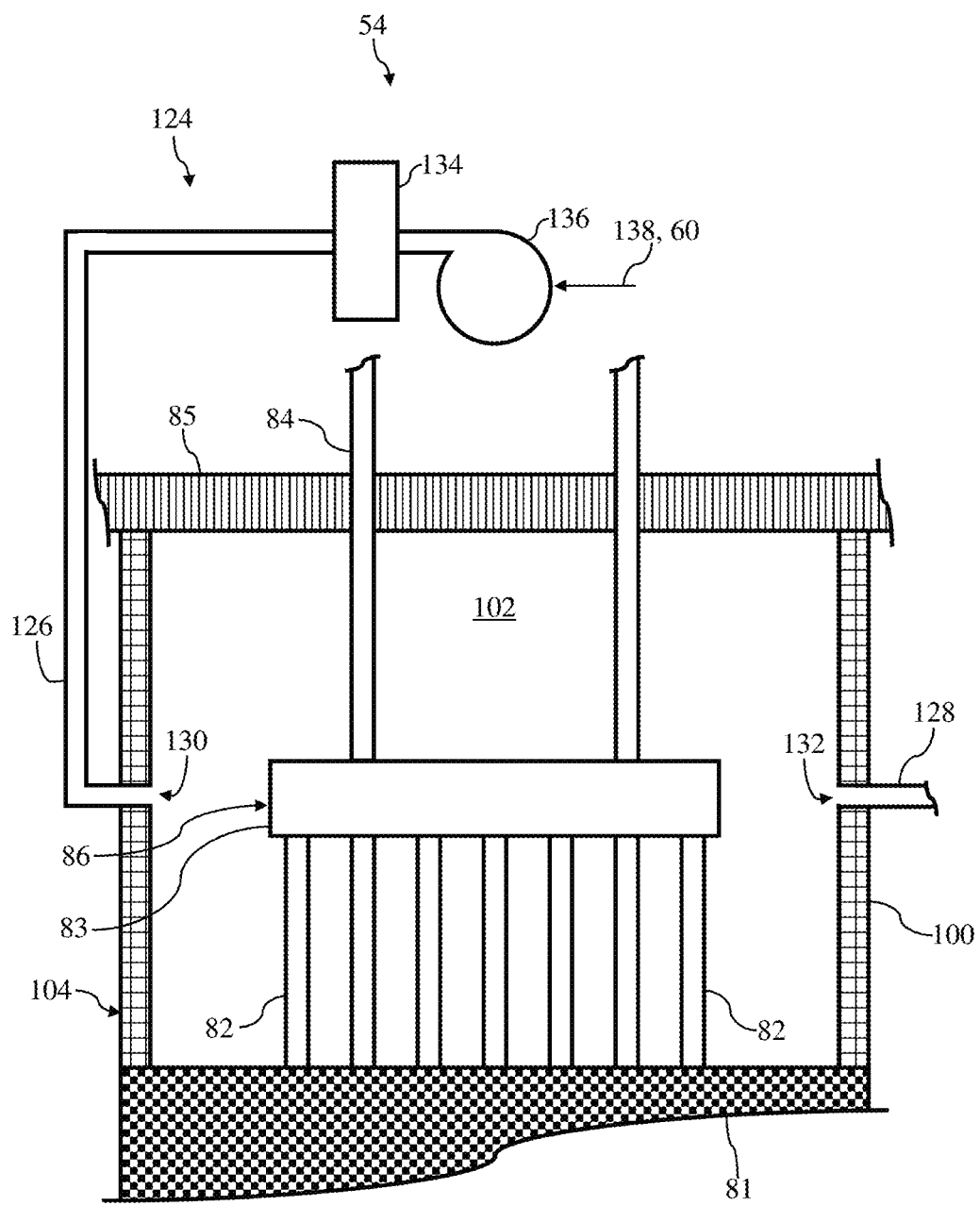
FIG. 10 shows a portion the HRSG of FIG. 2 including an enclosure surrounding a manifold of the HRSG, and a supplemental heating system in fluid communication with the enclosure, according to additional embodiments.
Figure 11:
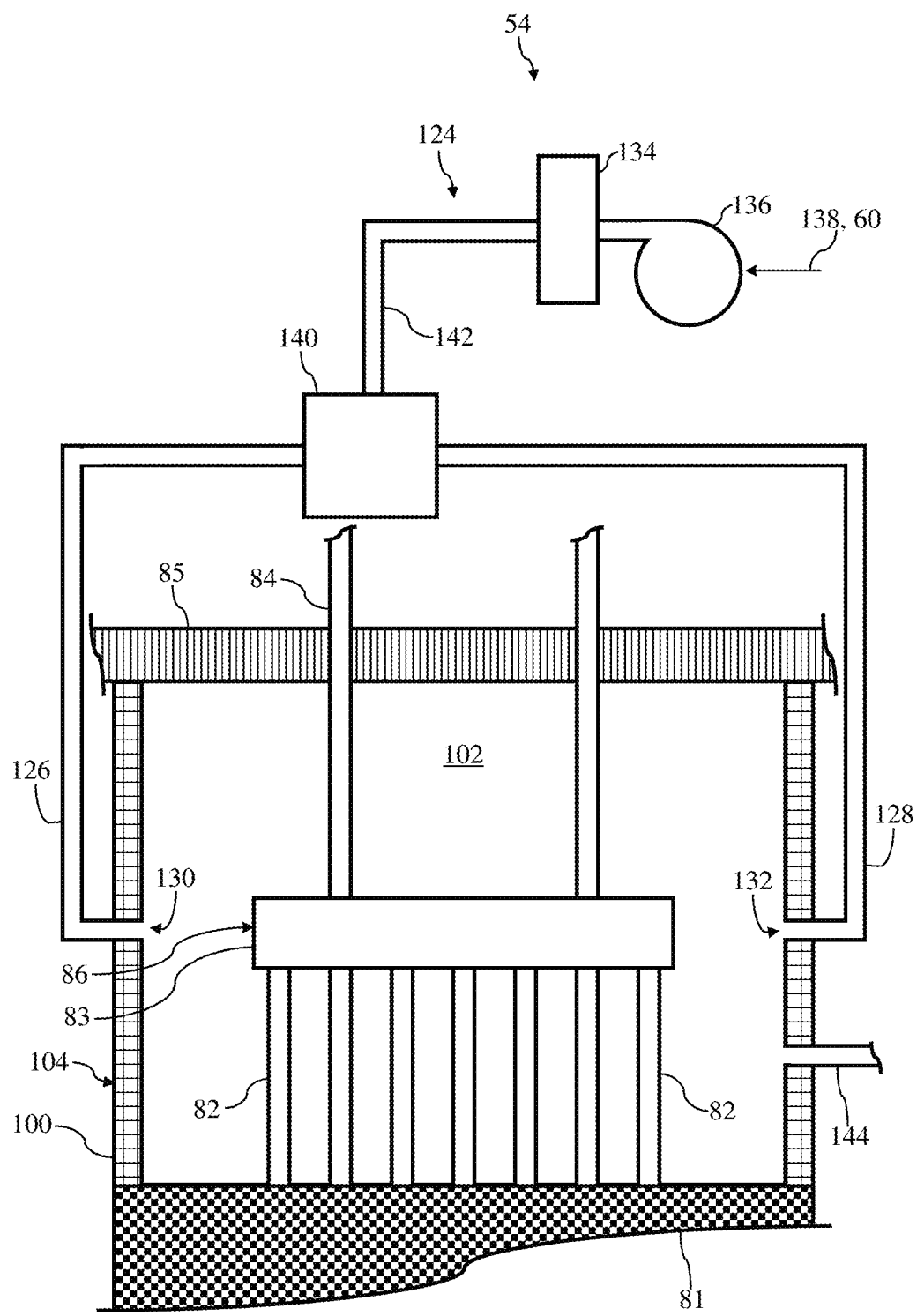
FIGS. 11 and 12 show a portion the HRSG of FIG. 2 including an enclosure surrounding a manifold of the HRSG, and a supplemental heating system including a eductor, according to various embodiments.
Figure 12:
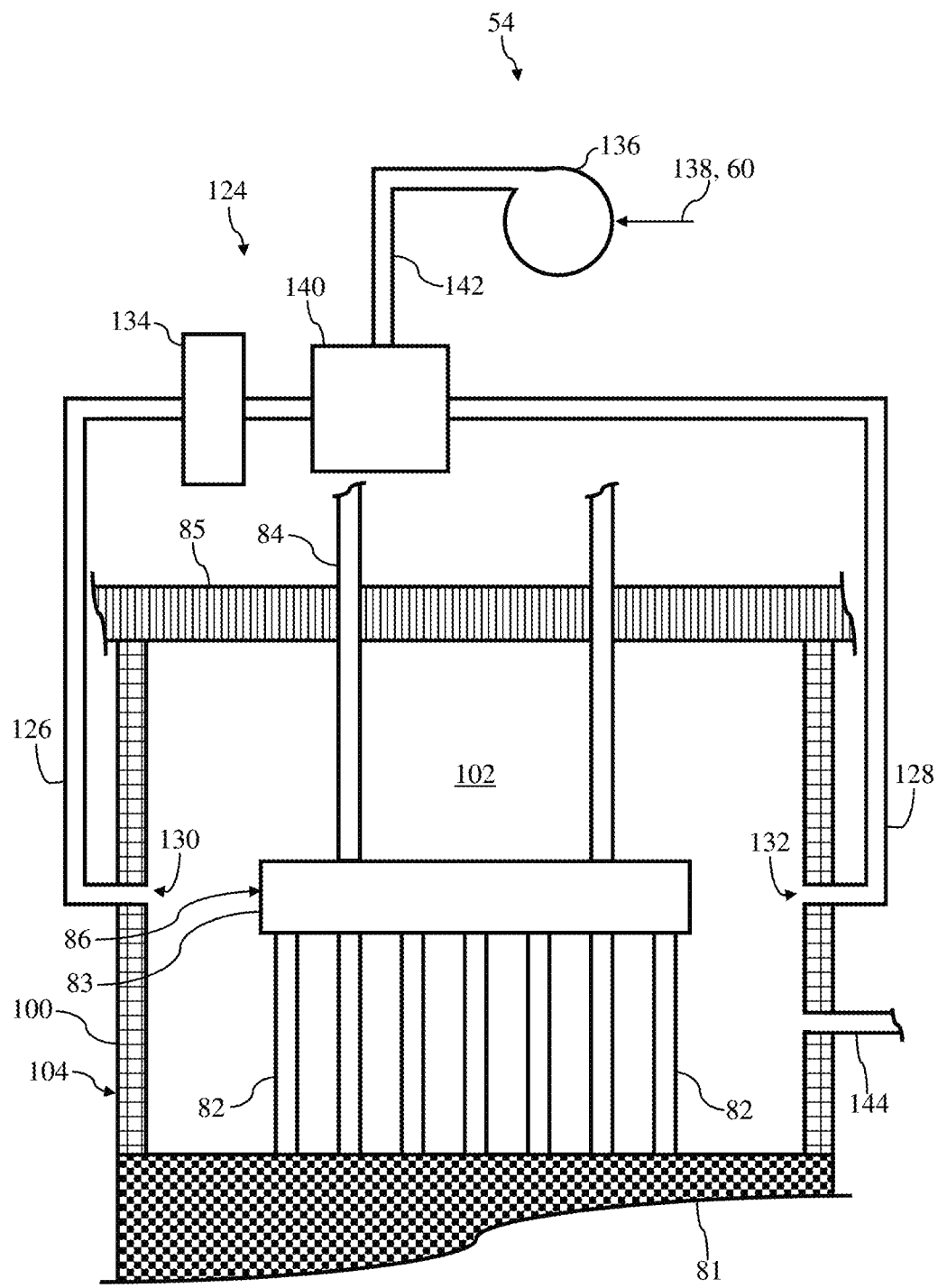

FIGS. 10-12 show additional non-limiting examples of a portion of HRSG 54 including enclosure 100 and supplemental heating system 124, similar to the non-limiting example discussed herein with respect to FIG. 9. However, the non-limiting examples may include distinct components and/or features as discussed herein. Additionally, computing device(s) 66, control system 68, and sensors 70 have been removed from FIGS. 10-12 for clarity and ease of review. However, it is understood that supplemental heating system 124, and specifically heater 134 and blower 136 in the non-limiting examples shown in FIG. 10-12, may be activated and/or controlled by control system 68, and/or may utilize temperature information detected by sensors 70 to adjust the operation of heater 134 and blower 136, as discussed herein. It is understood that similarly numbered and/or named components may function in a substantially similar fashion. Redundant explanation of these components has been omitted for clarity.

In the non-limiting example shown in FIG. 10, supplemental heating system 124 may not be a substantially closed circuit or system (e.g., FIGS. 8 and 9). Specifically as shown in FIG. 10, supplemental heating system 124 may be a substantially open system where the heated fluid supplied to interior 102 of enclosure 100 is removed, released, and/or exhausted into the atmosphere via outlet conduit 128. That is, outlet conduit 128 may only be in fluid communication with interior 102 of enclosure 100, and may not be coupled to and/or in fluid communication with any other portion of supplemental heating system 124. Rather, outlet conduit 128 may be in fluid communication with the atmosphere and/or ambient air, such that when heated fluid passes through interior 102 and/or over second manifold 83, the heated fluid may exit interior 102 of enclosure 100 into the atmosphere. In this non-limiting example, blower 136 of supplemental heating system 124 may be in fluid communication and/or may receive ambient air 138, that may be provided to heater 134 to generate heated fluid for enclosure 100, as discussed herein. In another non-limiting example, and as discussed herein, blower 136 of supplemental heating system 124 may be in fluid communication and/or may receive exhaust fluid 60 exhausted from GT system 30 or even exhaust fluid from a different available external source (e.g., a distinct power plant system, distinct GT system, exhaust storage component, and so on) that may be provided to heater 134 to generate heated fluid for enclosure 100.

FIGS. 11 and 12 show additional non-limiting example of supplemental heating system 124. Distinct from the examples discussed herein, supplemental heating system 124 shown in FIGS. 11 and 12 may also include an eductor 140 and an eductor conduit 142. Eductor 140 may be positioned between and fluidly coupled to or in fluid communication with inlet conduit 126 and outlet conduit 128, respectively. That is, eductor 140 may be positioned upstream of inlet conduit 126, downstream of outlet conduit 128, and may fluidly couple inlet conduit 126 and outlet conduit 128. As such, and substantially similar to the closed loop system discussed herein with respect to FIGS. 8 and 9, supplemental heating system 124 shown in FIGS. 11 and 12 may also be a substantially closed loop system. Specifically, eductor 140 fluidly coupling inlet conduit 126 and outlet conduit 128 may allow heated fluid to flow from interior 102 of enclosure 100, through outlet conduit 128, and back to inlet conduit 126. Additionally, eductor conduit 142 may be in fluid communication with eductor 140 and may provide additional, ambient air 138 or exhaust fluid 60 to eductor 140, and subsequently inlet conduit 126. Specifically, and as shown in FIGS. 11 and 12, blower 136 may be in fluid communication with and positioned upstream of eductor conduit 142 to provide eductor 150 with ambient air 138 or exhaust fluid 60.

Heater 134 of supplemental heating system 124 shown in FIGS. 11 and 12 may be positioned in various locations with respect to eductor 140. In the non-limiting example shown in FIG. 11, heater 134 may be in fluid communication with and positioned on eductor conduit 142, upstream of eductor 140 and downstream of blower 136. In this non-limiting example, heated fluid generated by heater 134 may enter eductor 140 before flowing through inlet conduit 126 and ultimately interior 102 of enclosure 100. In the non-limiting example shown in FIG. 12, heater 134 may be in fluid communication with and positioned on inlet conduit 126, downstream of eductor 140, eductor conduit 142, and blower 136, respectively. In this non-limiting example, ambient air 138 or exhaust fluid 60 may flow through eductor conduit 142 to eductor 140, and eductor 140 may subsequently provide ambient air 138 or exhaust fluid 60 to heater 134 to form heated fluid supplied to interior 102 of enclosure 100, as discussed herein.

In another not limiting example (not shown), heater 134 may be in fluid communication with and positioned on outlet conduit 128, upstream of eductor 140, eductor conduit 142, and blower 136, respectively. In this non-limiting example, ambient air 138 or exhaust fluid 60 may flow through eductor conduit 142 to eductor 140, and eductor 140 may subsequently provide ambient air 138 or exhaust fluid 60 to interior 102 of enclosure 100. Additionally, heater 134 may receive fluid from interior 102 of enclosure 100 via outlet conduit 128, may heat the fluid and subsequently provide the heated fluid to eductor 140 to be mixed with ambient air 138 or exhaust fluid 60 supplied to eductor 140 via eductor conduit 142 and/or blower 136, as discussed herein.

Additionally in the non-limiting examples shown in FIGS. 11 and 12, supplemental heating system 124 may also include a venting conduit 144. Venting conduit 144 may be formed through enclosure 100, and/or may in fluid communication with interior 102 of enclosure 100. Additionally, venting conduit 144 may be in fluid communication with the atmosphere and/or ambient air, and may remove at least a portion of the heated fluid from interior 102 of enclosure 100. That is, and because supplemental heating system 124 is a substantially closed loop but includes eductor 140 providing ambient air 138 to enclosure 100, supplemental heating system 124 may require venting conduit 144 to be formed through enclosure 100 to remove some of the heated fluid from interior 102. The removal of a portion of the heated fluid from interior 102 of enclosure 100 via venting conduit 144 may ensure that other components of supplemental heating system 124 (e.g., eductor 140, heater 134, inlet conduit 126) do not become overloaded (e.g., surpass flow rate, flow volume, flow pressure capabilities) during operation of power plant system 12, and/or degrade in operation and/or operational life.

Although discussed herein as reducing thermal stress for second manifold 83, it is understood that the non-limiting examples discussed herein may also help to reduce thermal stress experienced by other components of HRSG 54. For example, in the non-limiting examples discussed herein with respect to FIGS. 8-12, header 81 of HRSG 54 may also experience and/or be partially exposed to the heated fluid by supplemental heating system 124. That is, because header 81 forms defines and/or bounds enclosure 100, and is partially exposed within interior 102, header 81 may be exposed to heated fluid flowing through enclosure 100. As a result, header 81 may experience similar reduction in thermal stress during operation of HRSG 54, as similarly discussed herein with respect to second manifold 83.

Technical effect is to provide additional components and/or systems within a heat recovery steam generator (HRSG) of a combined cycle power plant system that are capable of reducing thermal stress experienced by manifolds within the HRSG.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A heat recovery steam generator (HRSG) comprising:
   a manifold receiving a working fluid of the HRSG;
   a plurality of piping links in fluid communication with the manifold;
   an enclosure surrounding the manifold and at least a portion of the plurality of piping links; and
   at least one thermal element positioned within the enclosure, the at least one thermal element surrounding the manifold.

2. The HRSG of claim 1, wherein the at least one thermal element includes:
   a heat storage component positioned within a casing, the heat storage component directly contacting and surrounding the manifold.

3. The HRSG of claim 2, wherein the at least one thermal element further includes:
   a thermally insulative shell surrounds the casing containing the heat storage component.

4. The HRSG of claim 2, further comprising:
   a heating component positioned within the casing containing the heat storage component, the heating component immersed within the heat storage component and at least partially surrounding the manifold; and
   a control system operably coupled to the heating component, the control system configured to activate the heating component.

5. The HRSG of claim 1, wherein the at least one thermal element includes:
   a thermally insulative shell directly contacting and surrounding the manifold.

6. The HRSG of claim 1, wherein the enclosure includes at least one of:
   a body formed from a thermally insulative material, or
   a body including an inner surface, and a thermally insulative layer lining the inner surface of the body of the enclosure.

7. The HRSG of claim 1, further comprising:
   a supplemental heating system in fluid communication with an interior of the enclosure, the supplemental heating system including:
      a heater for heating a fluid; and
      an inlet conduit in fluid communication with and positioned downstream of the heater, the inlet conduit formed through the enclosure to provide the heated fluid to the interior of the enclosure.

8. The HRSG of claim 1, wherein the at least one thermal element is in a liquid state when heated.

9. A heat recovery steam generator (HRSG) comprising:
   a manifold receiving a working fluid of the HRSG;
   a plurality of piping links in fluid communication with the manifold;
   an enclosure including an interior, the enclosure surrounding the manifold and at least a portion of the plurality of piping links; and
   a supplemental heating system in fluid communication with the interior of the enclosure, the supplemental heating system including:
      a heater for heating fluid; and
      an inlet conduit in fluid communication with and positioned downstream of the heater, the inlet conduit formed through the enclosure to provide the heated fluid to the interior of the enclosure.

10. The HRSG of claim 9, wherein the supplemental heating system further includes:
   a blower in fluid communication with and positioned upstream of the heater; and
   an outlet conduit formed through the enclosure to remove the heated fluid from the enclosure.

11. The HRSG of claim 10, wherein the outlet conduit of the supplemental heating system is in fluid communication with and positioned upstream of the blower.

12. The HRSG of claim 11, further comprising:
   an eductor positioned between and fluidly coupling the inlet conduit and the outlet conduit; and
   an eductor conduit in fluid communication with the eductor,
   wherein the blower is in fluid communication with and positioned upstream of the eductor conduit.

13. The HRSG of claim 12, wherein the heater is one of:
   in fluid communication with and positioned on the eductor conduit, upstream of the eductor, or
   positioned on the inlet conduit, downstream of the eductor.

14. The HRSG of claim 12, further comprising:
   a venting conduit formed through the enclosure to remove at least a portion of the heated fluid from the interior of the enclosure.

15. The HRSG of claim 10, wherein the outlet conduit is in fluid communication with ambient air.

16. The HRSG of claim 10, wherein the blower is in fluid communication with and receives one of:
   ambient air, or
   fluid previously heated by the heater.

17. The HRSG of claim 10, further comprising:
   a control system operably coupled to the heater and the blower, the control system configured to activate the heater and the blower.

18. A combined cycle power plant system comprising:
   a gas turbine system including a turbine component discharging an exhaust gas; and
   a heat recover steam generator (HRSG) in fluid communication with the turbine component for receiving the exhaust gas, the HRSG including:
      a manifold receiving a working fluid of the HRSG;
      a plurality of piping links in fluid communication with the manifold;
      a enclosure including an interior, the enclosure enclosing the manifold and at least a portion of the plurality of piping links; and
      at least one of:
         at least one thermal element positioned within the enclosure, the at least one thermal element surrounding the manifold, or
         a supplemental heating system in fluid communication with the interior of the enclosure, the supplemental heating system including:
            a heater for heating fluid; and
            an inlet conduit in fluid communication with and positioned downstream of the heater, the inlet conduit formed through the enclosure to provide the heated fluid to the interior of the enclosure.

19. The combined cycle power plant system of claim 18, wherein the at least one thermal element of the HRSG includes:
   a heat storage component positioned within a casing, the heat storage component directly contacting and surrounding the manifold.

20. The combined cycle power plant system of claim 18, wherein the supplemental heating system of the HRSG further includes:
   a blower in fluid communication with and positioned upstream of the heater; and
   an outlet conduit formed through the enclosure to remove the heated fluid from the enclosure.

* * * * *